United States Patent
Fromm et al.

(10) Patent No.: US 9,592,637 B2
(45) Date of Patent: Mar. 14, 2017

(54) DIRECT MARKING BUILD CART THAT IS ROBUST TO RAIL CONTAMINATION BY UNDER-RAIL MOUNTING AND COMPLIANT TOP WHEEL

(71) Applicant: Xerox Corporation, Norwalk, CT (US)

(72) Inventors: Paul M. Fromm, Rochester, NY (US);
Erwin Ruiz, Rochester, NY (US);
Steven M. Russel, Bloomfield, NY (US); Jeffrey J. Bradway, Rochester, NY (US); Jorge M. Rodriguez, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 106 days.

(21) Appl. No.: 14/715,950

(22) Filed: May 19, 2015

(65) Prior Publication Data

US 2016/0339637 A1    Nov. 24, 2016

(51) Int. Cl.
| | | |
|---|---|---|
| *B29C 67/00* | (2006.01) | |
| *B33Y 30/00* | (2015.01) | |
| *B33Y 40/00* | (2015.01) | |
| *B33Y 10/00* | (2015.01) | |

(52) U.S. Cl.
CPC ...... *B29C 67/0085* (2013.01); *B29C 67/0051* (2013.01); *B29C 67/0055* (2013.01); *B29C 67/0059* (2013.01); *B29C 67/0092* (2013.01); *B29C 67/0096* (2013.01); *B33Y 10/00* (2014.12); *B33Y 30/00* (2014.12); *B33Y 40/00* (2014.12)

(58) Field of Classification Search
CPC ............ B29C 67/0051; B29C 67/0055; B29C 67/0059; B29C 67/0085; B29C 67/0092; B29C 67/0096; B33Y 10/00; B33Y 30/00; B33Y 40/00

USPC ... 425/225, 232, 375, 174.4; 134/49, 122 R; 104/279

See application file for complete search history.

(56) References Cited

U.S. PATENT DOCUMENTS

| | | |
|---|---|---|
| 2,765,547 A | 10/1956 | Dimmel et al. |
| 2,944,275 A | 7/1960 | Markusen |
| 5,904,100 A | 5/1999 | Findley et al. |
| 6,047,645 A * | 4/2000 | Cornwell ............... B61B 13/04 104/124 |
| 6,191,507 B1 | 2/2001 | Peltier et al. |
| 6,688,021 B2 | 2/2004 | Baig et al. |

(Continued)

FOREIGN PATENT DOCUMENTS

EP    2 474 418 B1    7/2012

*Primary Examiner* — Matthew Daniels
*Assistant Examiner* — Lawrence D Hohenbrink, Jr.
(74) *Attorney, Agent, or Firm* — Maginot Moore & Beck LLP (57) ABSTRACT

A mobile cart that moves through a three-dimensional object printing system includes a platform, and at least one bearing operatively connected to the platform and configured to engage with a lower surface of a rail of the printing system in order to locate the platform with respect to an ejector head positioned opposite the rail. The cart further includes at least one other bearing operatively connected to the platform and configured to engage with an upper surface of the rail and apply a bias force that urges the at least one bearing against the lower surface of the rail. The rail can be configured to block material ejected by the ejector head from reaching the lower surface thereon.

15 Claims, 5 Drawing Sheets

(56) References Cited

U.S. PATENT DOCUMENTS

| | | |
|---|---|---|
| 7,070,250 B2 | 7/2006 | Lester et al. |
| 8,167,395 B2 | 5/2012 | Fienup et al. |
| 8,288,004 B2 | 10/2012 | Moorlag et al. |
| 8,692,011 B2 | 4/2014 | Moorlag et al. |
| 8,851,664 B2 | 10/2014 | Spence |
| 2011/0125307 A1 | 5/2011 | Dickson et al. |
| 2012/0157277 A1 | 6/2012 | Moorlag et al. |
| 2013/0293652 A1 | 11/2013 | Spence et al. |
| 2013/0293653 A1 | 11/2013 | Spence et al. |
| 2014/0125749 A1 | 5/2014 | Spence |

\* cited by examiner

DIRECT MARKING BUILD CART THAT IS ROBUST TO RAIL CONTAMINATION BY UNDER-RAIL MOUNTING AND COMPLIANT TOP WHEEL

TECHNICAL FIELD

This disclosure relates generally to three-dimensional object printers, and in particular to mobile carts for three-dimensional object printers.

BACKGROUND

Digital three-dimensional object manufacturing, also known as digital additive object manufacturing, is a process of making a three-dimensional solid object of virtually any shape from a digital model. Three-dimensional object printing is an additive process in which one or more ejector heads eject successive layers of material on a substrate in different shapes. Typically, ejector heads, which are similar to printheads in document printers, include an array of ejectors that are coupled to a different source of material. Ejectors within a single ejector head can be coupled to different sources of material or each ejector head can be coupled to different sources of material to enable all of the ejectors in an ejector head to eject drops of the same material. Materials that become part of the object being produced are called build materials, while materials that are used to provide structural support for object formation, but are later removed from the object are known as support materials. Three-dimensional object printing is distinguishable from traditional object-forming techniques, which mostly rely on the removal of material from a work piece by a subtractive process, such as cutting or drilling.

Figure 7:
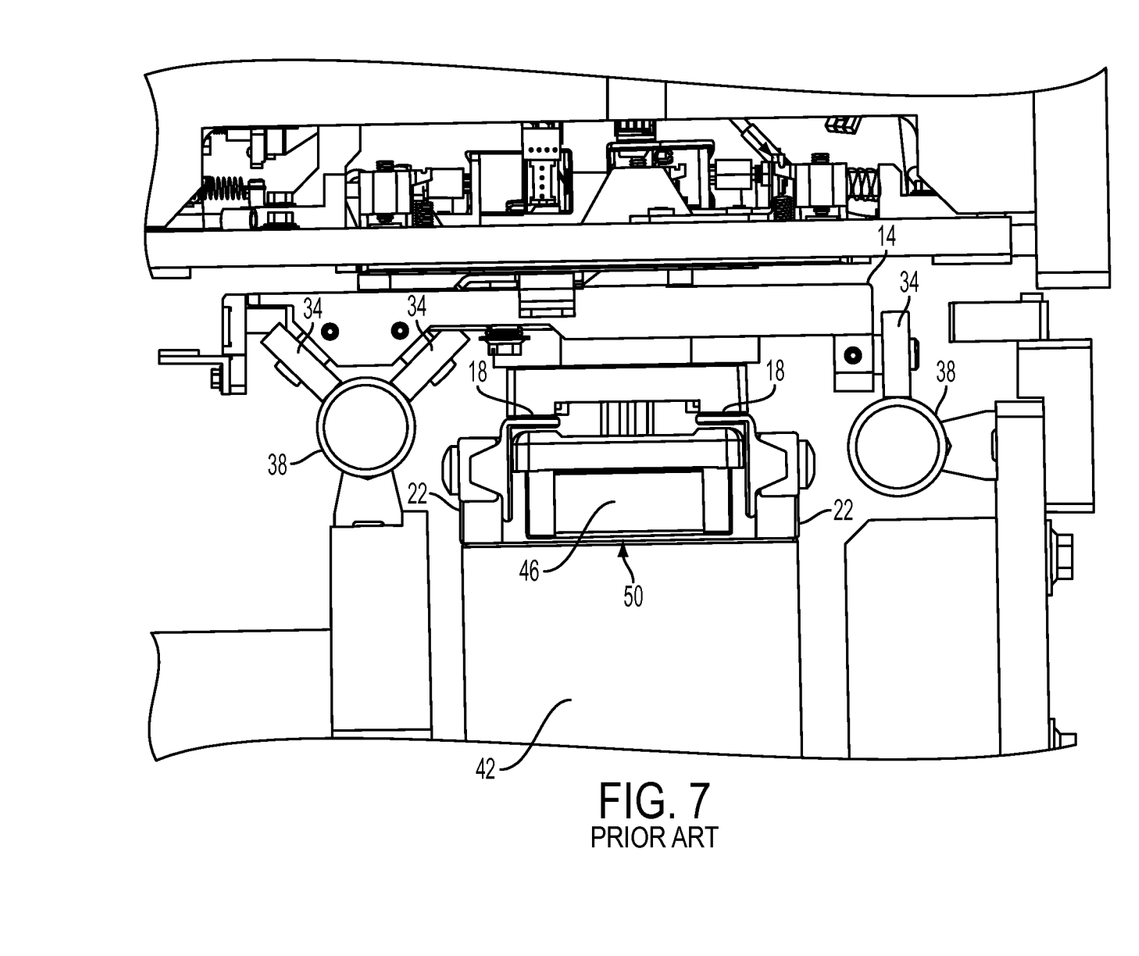
FIG. 7 is an end view of a known mobile cart that moves through a three-dimensional object printing system.
Figure 8:
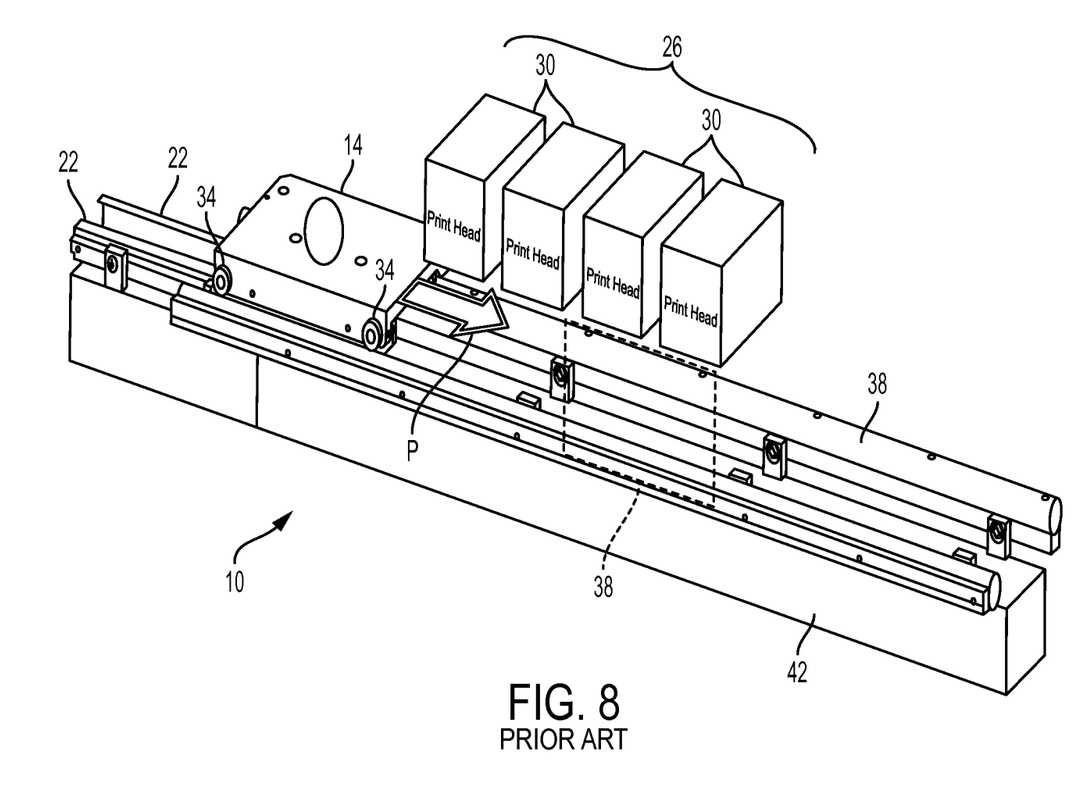
FIG. 8 is a perspective view of a known three-dimensional object printing system that uses mobile carts.

A previously known three-dimensional object printing system 10 is shown in FIG. 8. In the view depicted in that figure, a platform 14, called a cart, includes surfaces 18 (FIG. 7) that slide upon track rails 22 to enable the cart to move in a process direction P between printing stations, such as the printing station 26 shown in FIG. 8. Alternatively, carts can include wheels configured to roll along tracks, or other types of acceptable mobility mechanisms. Printing station 26 includes four ejector heads 30 as shown in the figure, although fewer or more ejector heads can be used in a printing station. Once the cart 14 reaches the printing station 26, the cart 14 transitions to and moves along precision rails 38 through the printing station. Precision rails 38 are cylindrical rail sections that are manufactured within tight tolerances to help ensure accurate placement and maneuvering of the cart 14 beneath the ejector heads 30. Linear electrical motors are provided within housing 42 to interact with a magnet inside housing 46, which is connected to the lower surface of the cart 14. The motors generate electromagnetic fields that interact with the magnet to propel the cart along the track rails 22 between print stations and along the precision rails 38 within the printing stations. Once the cart 14 is beneath the printing station 26, ejection of material occurs in synchronization with the motion of the cart. Electrical motors (not shown) are operatively connected to a gantry to which the ejector heads are mounted to move the ejector heads in an X-Y plane that is parallel to an upper surface of the cart 14 and perpendicular to the motion of the cart down the track or rail as layers of material are formed in the object. Additional motors (not shown) move the printing station 26 vertically with respect to the cart 14 as layers of material accumulate to form an object. Alternatively, a mechanism can be provided to move an upper surface of the cart 14 vertically and horizontally for formation of the object. Once the printing to be performed by a printing station is finished, the cart 14 is moved to another printing station for further part formation, layer curing, or other processing.

An end view of the system 10 is shown in FIG. 7. That view depicts in more detail the surfaces 18 that rest upon the rails 22 that extend from and above the electrical motor housing 42. As the motors generate electromagnetic fields that interact with the magnet in housing 46, the surfaces 18 of the cart 14 slide along the track rails 22. At the printing station, the bearings 34 of the cart 14 contact the precision rails 38 in an arrangement that facilitates accurate positioning of the build platen on the cart 14. Specifically, bearings 34 are positioned at a right angle to one another on one of the rails 38 to remove four degrees of freedom of the cart 14, while the other bearing 34 rests on the other rail 38 to remove one more degree of freedom. Gravity and magnetic attraction between the electrical motor and the magnet in the housing 46 hold the bearings 34 in contact with the rails 38.

When carts are not present underneath the ejector heads 30, errant drops of materials can fall from the ejector heads and produce undesired debris and contamination on the precision rails 34 and the housing 42. Contaminants can become hardened in the presence of ultra-violet radiation, which may be used during a curing process in the printing system 10 or by cooling in the case of thermoplastic materials. This can lead to a continual buildup of a layer of contaminating material. Other materials such as particulates and other stray matter can also accumulate on the rails 34 or other portions of the printing system 10 and interfere with a printing operation.

In order to produce three-dimensional objects with acceptable quality, the motion of the cart 14 beneath the ejector heads 30 needs to be precise. If materials from the ejector heads collect where the bearings 34 interface with the precision rails 38, the linear velocity of the cart 14 is disrupted and the quality of the printed object is affected. Additionally, the collection of material drops on top of the housing 42 may affect the dissipation of heat from the motors and impact the performance and reliability of the motors. Therefore, improvements in three-dimensional object printing systems that mitigate the risk of contamination on the precision rails, motor housing, and mobile cart would be beneficial.

SUMMARY

In order to decrease contamination and facilitate accurate and efficient printing, a three-dimensional object printing system includes at least one rail, an ejector head positioned opposite the at least one rail, and a mobile cart that is configured to move along the at least one rail. The at least one rail has an upper surface and a lower surface, and the ejector head is positioned opposite the at least one rail, and is configured to eject media for forming a three dimensional object.

The mobile cart includes a platform, and a plurality of bearings that are operatively connected to the platform. At least one bearing is configured to engage with the lower surface of the at least one rail to locate the platform with respect to the ejector head. At least one other bearing is configured to engage with the upper surface of the at least one rail and apply a biasing force that urges the at least one bearing against the lower surface of the at least one rail.

BRIEF DESCRIPTION OF THE DRAWINGS

The foregoing aspects and other features of the present disclosure are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
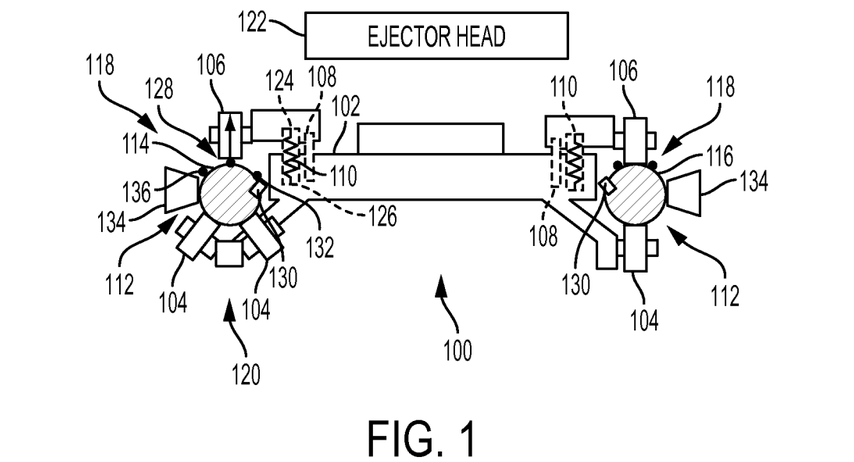
FIG. 1 is an end view of an exemplary embodiment of a mobile cart that moves through a three-dimensional object printing system according to this disclosure.

FIG. 1 depicts an exemplary embodiment of a mobile cart 100 that moves from processing station to processing station in a three-dimensional object printing system. The mobile cart 100 includes a platform 102, a first plurality of bearings 104, a second plurality of bearings 106, a pair of guides 108, and biasing members 110. The bearings 104 are operatively connected to the platform 102 and are configured to engage with and move along a lower surface 112 of a pair of parallel rails 114 and 116 of the printing system. The bearings 106 are operatively connected to the platform 102, and are configured to engage with and move along an upper surface 118 of the parallel rails 114, 116. The bearings 104 and 106 are configured as wheels that roll along the tracks 114, 116, but other types of movement mechanisms are also contemplated, such as sliding surfaces, and planar, fluidic, and magnetic bearings.

In the embodiment illustrated in FIG. 1, the first plurality of bearings 104 are arranged with a pair 120 of the bearings 104 positioned to engage the lower surface 112 of the rail 114 so the bearings in the pair 120 are at an angle relative to each other. The angle can be, for example, in a range from about 20 degrees to about 160 degrees, in particular from about 50 degrees to about 90 degrees, or about 70 degrees. The second plurality of bearings 106 are arranged with each bearing 106 of the pair engaging the upper surface 118 of one of the rails 114, 116, respectively. In other embodiments, the mobile cart 100 includes other numbers and groupings of bearings 104, 106, and such bearings 104, 106 can be configured and arranged to engage and move along other numbers of rails.

The first plurality of bearings 104 is operatively connected to the platform 102 so as to have a fixed location relative to the platform 102. An ejector head 122 is positioned opposite the rails 114 and 116 and is configured to eject material to form a three-dimensional object on the upper surface of the platform 102. The rails 114 and 116 are precisely located relative to the ejector head 122, and the bearings 104, when engaged with the lower surfaces 112 of the rails 114, 116, accurately locate the platform 102 relative to the ejector head 122. Such accurate location enables the ejector head 122 to accurately and efficiently eject material onto the platform 102 in order to form a three-dimensional object.

To ensure that the bearings 104 are engaged with the lower surfaces 112, the bearings 106 are further configured to apply a bias force that urges the bearings 104 against the lower surfaces 112. In this embodiment, the bias force is at least partially provided by the biasing members 110. In this embodiment, the biasing members 110 are springs which are respectively operatively connected at one end 124 to each bearing 106, and at another end 126 to the platform 102. As shown, the bearings 106 are operatively connected to the platform 102 to be movable relative to the platform 102. The guides 108 constrain the movement of the bearings 106 relative to the platform in response to the bias force to a direction between the bearings 104 and the bearings 106. In this embodiment, the guides 108 are linear slides.

The spring biasing members 110 in this embodiment are oriented in a direction that is parallel to a longitudinal axis of the guides 108 to enable the bias force to be applied in the direction between the bearings 104, 106. In other words, the guides 108 enable the biasing force to bias the bearings 104 against the rails 114 and 116 and towards the bearings 106 such that the bearings 104, 106 hold the mobile cart captive on the rails 114, 116. While this embodiment includes a respective guide 108 and biasing member 110 for each bearing 106, other embodiments include other numbers of guides 108 and biasing members 110. In one embodiment, a plurality of biasing members 110 is operatively connected between each bearing 106 and the platform 102.

As described above, material ejected from the ejector head 122 and other stray matter, such as the contaminant 128, can accumulate on the tracks 114, 116. Since the bearings 106 are movable relative to the platform 102, when a bearing 106 moves over the contaminant 128, the bearing 106 moves along the guide 108 and away from the track 114 and bearings 104. As shown in FIG. 1, the bearing 106 on the left that is passing over the contaminant 128 is farther away from the track 114 than the other bearing 106 on the right is from the track 116. The bias force, acting in the direction of the bearings 104 and thus counter to the direction of motion of the bearing 106 in response to the contaminant 128, maintains the engagement of the bearings 104 against the lower surface 112 of the rails 114, 116. In other words, while the second members 106 move in response to the mobile cart 100 passing over a portion of the rails 114 and 116 that has contaminants, the bias force applied by the bearings 106 ensures that the platform 102 remains properly located with respect to the ejector head 112. Thus, this configuration provides a mobile cart 100 that is robust with respect to contamination of the rails 114, 116.

Maintaining solid engagement between the bearings 104 and the lower surfaces 112 of the rails 114 and 116 is beneficial to providing a mobile cart 100 that is robust in the manner described above. In one embodiment, the biasing members 110 are preloaded. "Preloaded" as used herein means that the biasing members 110 are in a loaded state rather than a resting state when the mobile cart 100 is mounted on the rails 114, 116. In this embodiment, the biasing members 100 are springs. Springs have a natural resting position, whereby extending or compressing the spring results in a countering bias force. By configuring the spring biasing members 100 such that the springs are compressed or extended from a resting state when the mobile cart 100 is mounted on the rails 114, 116, the spring acts to counter the compression or extension, and is preloaded. Other acceptable methods of preloading various types of biasing members 110 are also contemplated.

In an example, a biasing member can be preloaded by a weight of the platform 102, by an extent of the guide 108, by an unloaded configuration or arrangement of the biasing members 110, or by other acceptable preloading methods. When the biasing members 110 are preloaded, the first bearings 104 are biased against the lower surfaces 112 of the rails 114 and 116 even when no contaminants are present on the rails 114, 116.

Even though the lower surfaces 112 of the rails 114 and 116 face away from the ejector head 122, some types of material ejected by the ejector head 122 could, for example, travel around the upper surfaces 118 and accumulate on the lower surfaces 112 of the rails 114, 116. In FIG. 1, a respective member 130 is affixed to and runs along a length of each of the rails 114, 116. Each member 130 is configured to at least partially block the lower surfaces 112 from material ejected by the ejector head 122. In an example, the contaminant 132 on rail 114, after travelling down a portion of the upper surface 118 thereon, was blocked from reaching the lower surface 112 by the member 130. Additionally, as illustrated in FIG. 1, another respective member 134 is also affixed to each rail 114 and 116 and is also configured to at least partially block the lower surfaces 112 from material ejected by the ejector head 122, such as the contaminant 136. In this embodiment, the members 130 are positioned on a portion of the rails 114 and 116 facing the platform 102, and the members 134 are affixed to a portion of the rails 114 and 116 facing away from the platform 102. In this embodiment, the members 134 are support members configured to support the rails 114 and 116 respectively. Such support members can be connected to other support structures of the printing system (not illustrated). The members 130 and 134 together define a separation between the upper surfaces 118 and the lower surfaces 112 of the rails 114 and 116 to prevent the passage material past the members. This configuration ensures that the lower surfaces 112 remain free of contaminants and enables the mobile cart 100 to smoothly and accurately move through the printing system. In another embodiment (not illustrated) the members 130 and/or members 134 are configured to guide travelling material away from the rails 114 and 116 rather than trap the contaminants. For example, the members 130 or 134 can act as a shingle that guides travelling contaminants away from surfaces where accumulation of contaminants can impact the performance of the printing system.

Figure 2:
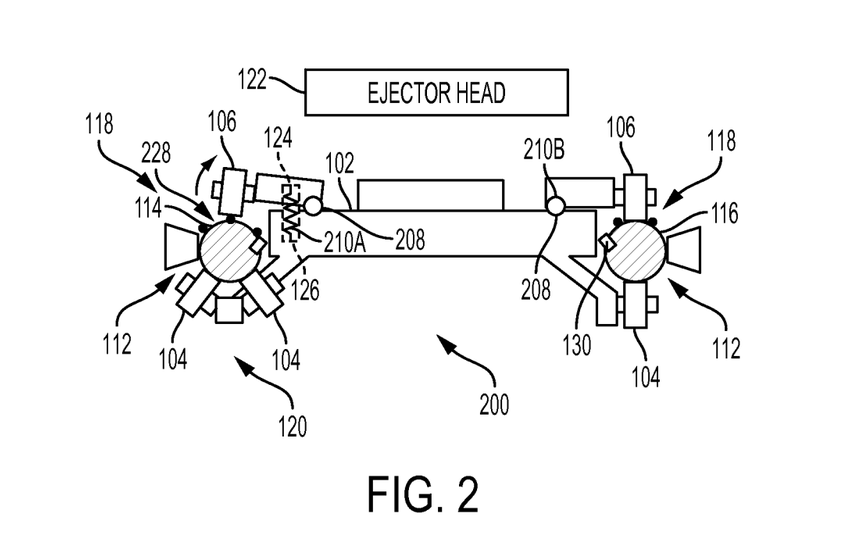
FIG. 2 is an end view of another exemplary embodiment of a mobile cart that moves through a three-dimensional object printing system according to this disclosure.

FIG. 2 illustrates a side view of another exemplary embodiment of a mobile cart 200 having rotational guides 208. The guides 208 restrict motion of the bearings 106 to be a rotation about the guides 208 on an axis running parallel to the tracks 114 and 116. In this embodiment, the guides 208 include a pin connection that enables the bearings 116 to rotate about the guides, but other acceptable types of rotational guides, including a curved track, are also contemplated. The spring members in this embodiment can be a tension/compression spring 210A, a torsional spring 210B, or other types of acceptable springs acting on a rotating element. When the cart 200 passes over a contaminant 228, the bearing 106 is pushed away from the track 114. The guide 208 guides the resulting motion of the bearing 106 to be a rotation about the guide 208, and the spring 210A causes the bearings 104 to be biased against the track 114.

Figure 3:
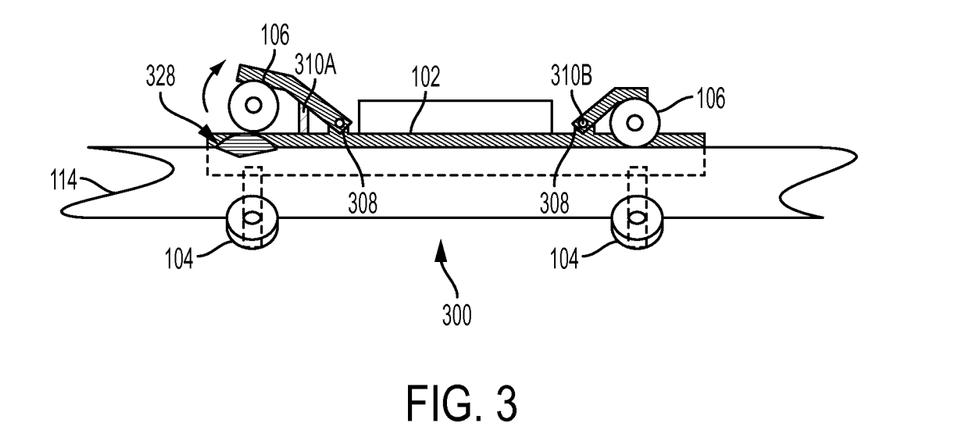
FIG. 3 is a side view of a further exemplary embodiment of a mobile cart that moves through a three-dimensional object printing system according to this disclosure.

FIG. 3 illustrates a side view of another exemplary embodiment of a mobile cart 300 having rotational guides 308. The guides 308 restrict the bearings 106 to rotate about the guides 308 around an axis that runs in a cross process direction across the track 114. In this embodiment, the guides 308 include a pin connection that enables the bearings 116 to rotate about the guides, but other acceptable types of rotational guides include a curved track and the like. The spring members in this embodiment can be a tension/compression spring 310A, a torsional spring 310B, or other types of springs acting on a rotating element. When the cart 300 passes over a contaminant 328, the bearing 106 is pushed away from the track 114. The guide 308 guides the bearing 106 to rotate about the guide 308, and the spring 310A biases the bearings 104 against the track 114.

Figure 4:
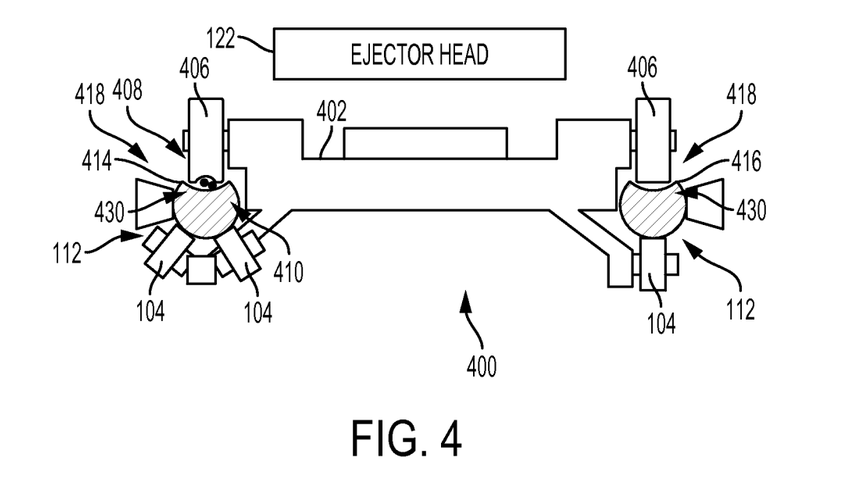
FIG. 4 is an end view of yet another exemplary embodiment of a mobile cart that moves through a three-dimensional object printing system according to this disclosure.

FIG. 4 illustrates yet another exemplary embodiment of a mobile cart 400 that moves through a three-dimensional printing system. The mobile cart 400 includes a platform 402, a first plurality of bearings 104, and a second plurality of bearings 406. The bearings 104 are operatively connected to the platform 402 so that they are at a fixed location relative to the platform 402, and are configured to roll along lower surfaces 112 of rails 414 and 416. The bearings 406 are also operatively connected to the platform 402 so they are at a fixed location relative to the platform 402 and are configured to engage upper surfaces 418 of the rails 414 and 416. When engaged with the lower surfaces 112, the bearings 104 locate the platform 402 with respect to the ejector head 122, which is positioned opposite the rails 414 and 416. The bearings 406 are configured to deform in response to the bearings passing over contaminants on the upper surface 418 of the rails 414 and 416. For example, as illustrated in FIG. 3, the left bearing 406 has a region 408 that is deformed in response to the region passing over contaminants 410 that have accumulated on the rail 414.

In one embodiment, the bearings 406 are at least partially formed from an elastic or resilient material, so the bearings 406 can apply a bias force due to the elastic deformation of the region 408. In other words, the left bearing 406 acts towards restoring an un-deformed shape. Since the bearings 406 are operatively connected to the platform 402 so they are at a fixed location relative to the platform 402, this restorative force acts to bias the bearings 104 against the lower surfaces 112 of the rails 414 and 416. Thus, while the bearings 406 may deform in response to passing over contaminants, the platform 402 maintains its location relative to the ejector head 122.

In one embodiment, the bearings 406 are preloaded. For example, the bearings 406 are configured so they are in an un-deformed state when the mobile cart 400 is not moving along rails and so that the upper surfaces 418 of the rails 414 and 416 at least partially deform the bearings 406. This configuration biases the bearings 104 against the lower surfaces 112 even when no contaminants are present. This interaction enables the mobile cart 400 to smoothly and accurately move along the rails 414 and 416.

As discussed above, blocking material ejected from the ejector head 122 that reaches the upper surfaces 418 of the rails 414 and 416 from travelling to the lower surfaces 112 would be beneficial. The upper surfaces 418 of the rails 414 and 416 each define a channel 430 that is configured to receive the bearings 406 and enable the bearing 406 to roll within the channel, and is further configured to trap material ejected by the ejector head 122 or other contaminants and block such contaminants from traveling from the upper surfaces 418 to the lower surfaces 112. In this embodiment, the channel 430 is defined by a semicircular cutout in the upper surfaces 418 such that contaminants are drawn into a central region of the channel, but other acceptable shapes for the channel are also contemplated.

In some three-dimensional object printing systems, such as the printing system 10 described above with regard to FIG. 8, the precision rails 38 only extend through a portion of the printing system having printing stations 26 that perform operations on mobile carts 14. In other portions of the printing systems, mobile carts 14 can move along rails 22, such as via sliding surfaces 18. When a mobile cart, such as the mobile carts 100, 200, 300, and 400 described above, are not moving along the precision rails, the second plurality of bearings may be in an unloaded or un-deformed state. In the printing system 10 illustrated in FIG. 8, the precision rails 38 have a flat end. In such a configuration, the second plurality of bearings that engage the precision rails 38 as the cart 14 moves on the rails would rapidly transition from the unloaded/un-deformed state to a loaded/deformed state. This configuration also induces a rapid change in the bias force acting on the first plurality of bearings. Such rapid transition and change in the bias force can result in disturbing or damaging the cart and an object being formed on the cart. Additionally, such a transition may temporarily unsettle the cart 14, requiring a longer precision rail 38, so that the cart 14 can sufficiently settle before arriving at a printing station. Smoothing the transition and application of the bias force would be beneficial.

Figure 5:
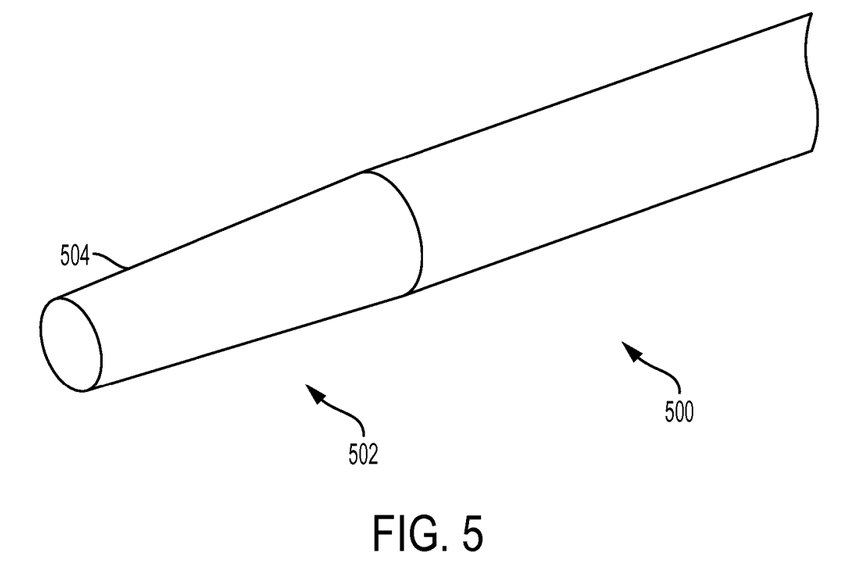
FIG. 5 is a perspective view of an end portion of a rail of a three-dimensional object printing system according to this disclosure.

FIG. 5 illustrates an exemplary embodiment of an end portion 502 of a rail 500 for a three-dimensional object printing system, where the first end portion 502 includes a taper 504. The taper 504 has a first diameter at an extent of the rail 500, and transitions to a second diameter that is larger than the first diameter, and that is configured to gradually engage the first plurality and second plurality of bearings of a mobile cart. When the mobile cart 300 reaches the first end portion 502 of the rail 500, the taper 504 gradually engages the second plurality of bearings 506 and 508 of the mobile cart 300 so that the bias force is gradually applied as the mobile cart moves along the taper 504.

Figure 6:
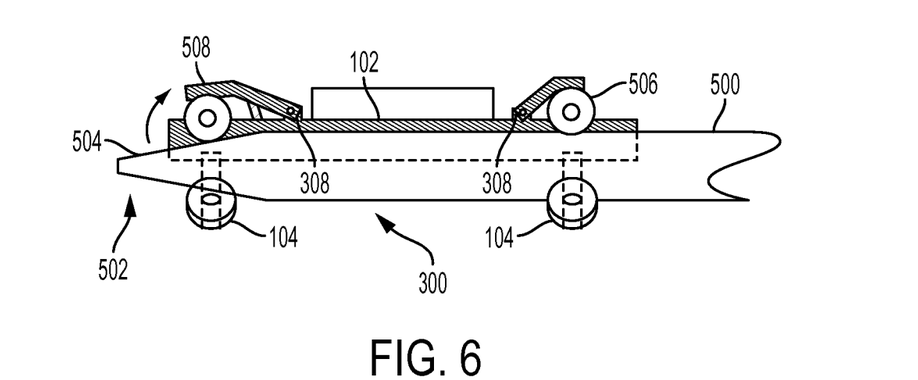
FIG. 6 is a side view of an exemplary embodiment of a mobile cart that moves through a three-dimensional object printing system moving onto the rail of FIG. 5.

FIG. 6 illustrates an exemplary embodiment where a mobile cart 300 is gradually engaging a taper 504 at the end portion 502 of the rail 500. In FIG. 6, the bearing 506 has moved beyond the taper 504 and is fully biased against the rail 500, and the bearing 508 is passing through the taper 504, and thus is only partially biased against the rail 500. When the mobile cart 300 has passed by the first end portion 502, the second plurality of bearings 506, 508 is fully engaged and the bias force is fully applied. The gradual application of the bias force enables the mobile cart to smoothly transition onto the rail 500.

Before a precise printing operation can be performed on the cart 300, the cart 300 must be on a flat portion of the rail 500, i.e. the cart 300 must have moved beyond the first end region 502 of the rail 500. Therefore, the taper 504 of the rail 500 extends beyond a region of the printing system that includes printing stations like an ejector head, so that the cart 300 is fully on a flat portion of the rail 500 when it reaches the ejector head.

In an embodiment, the rail 500 further includes a second end portion opposite the first end portion and having a second taper, which transitions from the second diameter to the first diameter at a second extent of the rail 500 to enable the mobile cart to smoothly transition off from the rail 500. In other embodiments, the end of the rail 500 opposite the taper 504 is a flat end.

As illustrated in FIG. 5, the taper 504 has a conical section shape, but in other embodiments, acceptable taper shapes include ramps, radiuses, steps, chamfers, and the like. In one embodiment, the rail 500 includes a radius or chamfer that smoothens out a transition between the taper 504 and the remainder of the rail 500. Such a smoothed transition can reduce vibration of the cart 300 at the transition, and enable the cart to settle on the flat portion of the rail 500 in a shorter period of time and over a shorter extent of the rail 500.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A mobile cart that moves through a three-dimensional object printing system, the mobile cart comprising:
a platform;
at least one bearing that is operatively connected to the platform and is configured to engage with a lower surface of at least one rail of the printing system to locate the platform with respect to an ejector head of the printing system; and
at least one other bearing that is operatively connected to the platform and is configured to engage with an upper surface of the at least one rail and apply a biasing force that urges the at least one bearing against the lower surface of the at least one rail, the at least one other bearing being configured to deform in response to passing over contaminants on the upper surface of the at least one rail to maintain a distance between the platform and the at least one bearing.

2. The mobile cart of claim 1, the platform including:
at least one guide that constrains movement of the at least one other bearing relative to the platform to a direction between the at least one bearing and the at least one other bearing in response to the biasing force; and
a biasing member that applies the biasing force to the at least one bearing.

3. The mobile cart of claim 2, the biasing member further comprising:
a spring operatively connected between the at least one other bearing and the platform, the spring being configured and arranged to act in opposition to a direction of motion of the at least one other bearing as constrained by the at least one guide.

4. The mobile cart of claim 2, wherein the biasing member is preloaded.

5. The mobile cart of claim 1, the at least one bearing further comprising:
a pair of bearings configured to engage the lower surface of the at least one rail at a right angle to each other.

6. A three dimensional object printing system comprising:
at least one rail that includes an upper surface and a lower surface;
an ejector head configured to eject material for forming a three dimensional object; and
a mobile cart that is configured to move along the at least one rail, and the mobile cart includes:
a platform;

at least one bearing that is operatively connected to the platform and is configured to engage with the lower surface of the at least one rail to locate the platform with respect to the ejector head;

at least one other bearing that is operatively connected to the platform and is configured to engage with the upper surface of the at least one rail and apply a biasing force that urges the at least one bearing against the lower surface of the at least one rail; and the upper surface of the at least one rail having a channel configured to receive the at least one other bearing to enable the at least one other bearing to roll within the channel, trap material elected by the elector head, and block the lower surface of the at least one rail from material elected by the elector head.

7. The printing system of claim 6, wherein the at least one rail includes a pair of parallel rails.

8. The printing system of claim 6, the platform including:
at least one guide that constrains movement of the at least one other bearing relative to the platform in response to the biasing force to a direction between the at least one bearing and the at least one other bearing; and
a biasing member that applies the biasing force to the at least one bearing.

9. The printing system of claim 8, the biasing member further comprising:
a spring operatively connected at one end to the at least one other bearing and at another end to the platform, the spring being configured and arranged to act in opposition to a direction of motion of the at least one other bearing as constrained by the at least one guide.

10. The printing system of claim 8, wherein the biasing member is preloaded.

11. The printing system of claim 6, the at least one bearing further comprising:
a pair of bearings configured to engage the lower surface of the at least one rail at a right angle to each other.

12. The printing system of claim 6, each rail of the at least one rail includes:
a first end that has a taper configured to gradually engage the at least one other bearing of the mobile cart to gradually apply the biasing force as the mobile cart moves past the taper and onto the at least one rail.

13. A three-dimensional object printing system comprising:
at least one rail that includes an upper surface and a lower surface;
an elector head configured to elect material for forming a three-dimensional object; and
a mobile cart that is configured to move along the at least one rail, the mobile cart includes:
a platform;
at least one bearing that is operatively connected to the platform and is configured to engage with the lower surface of the at least one rail to locate the platform with respect to the elector head;
at least one other bearing that is operatively connected to the platform and is configured to engage with the upper surface of the at least one rail and apply a biasing force that urges the at least one bearing against the lower surface of the at least one rail;
at least one member respectively affixed to each of the at least one rails that runs along a length of the at least one rail, the at least one member configured to at least partially block the lower surface of the at least one rail from material ejected by the ejector head; and
a respective additional member configured to support each of the at least one rail, the at least one member being configured to block a first lateral side of the lower surface of the at least one rail from material elected by the elector head, and the respective additional member is configured to block a second lateral side of the at least one rail opposite the first lateral side from material elected by the elector head.

14. The printing system of claim 13, each member of the at least one member being further configured to support a corresponding rail of the at least one rail.

15. A three-dimensional object printing system comprising:
at least one rail that includes an upper surface and a lower surface;
an elector head configured to elect material for forming a three-dimensional object; and
a mobile cart that is configured to move along the at least one rail, and that includes:
a platform;
at least one bearing that is operatively connected to the platform and is configured to engage with the lower surface of the at least one rail to locate the platform with respect to the elector head;
at least one other bearing that is operatively connected to the platform and is configured to engage with the upper surface of the at least one rail and apply a biasing force that urges the at least one bearing against the lower surface of the at least one rail, and the at least one other bearing is further configured to deform in response to passing over contaminants on the upper surface of the at least one rail to maintain a distance between the platform and the at least one bearing.

* * * * *